United States Patent
Joffe et al.

(10) Patent No.: US 9,354,690 B1
(45) Date of Patent: May 31, 2016

(54) SYSTEMS AND METHODS FOR ADJUSTING CORE VOLTAGE TO OPTIMIZE POWER SAVINGS

(75) Inventors: Daniel M. Joffe, Owens Crossroads, AL (US); Brian Smith, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 198 days.

(21) Appl. No.: 13/077,572

(22) Filed: Mar. 31, 2011

(51) Int. Cl.
*G06F 1/26* (2006.01)
*G06F 1/32* (2006.01)

(52) U.S. Cl.
CPC . *G06F 1/324* (2013.01); *G06F 1/26* (2013.01)

(58) Field of Classification Search
None
See application file for complete search history.

(56) References Cited

U.S. PATENT DOCUMENTS

| | | | |
|---|---|---|---|
| 5,623,647 A | 4/1997 | Maitra | |
| 5,745,375 A | 4/1998 | Reinhardt et al. | |
| 5,953,685 A | 9/1999 | Bogin et al. | |
| 6,363,490 B1 | 3/2002 | Senyk | |
| 6,415,388 B1 | 7/2002 | Browing et al. | |
| 6,477,115 B1 * | 11/2002 | Inoshita et al. | 368/120 |
| 7,076,672 B2 | 7/2006 | Naveh et al. | |
| 7,304,905 B2 | 12/2007 | Hsu et al. | |
| 7,514,974 B2 * | 4/2009 | Block et al. | 327/161 |
| 7,908,508 B2 * | 3/2011 | Kernahan et al. | 713/600 |
| 2005/0058234 A1 * | 3/2005 | Stojanovic | 375/371 |
| 2005/0068110 A1 * | 3/2005 | Hui et al. | 331/1 A |
| 2007/0266263 A1 * | 11/2007 | Lee et al. | 713/300 |
| 2008/0191756 A1 * | 8/2008 | Li et al. | 327/147 |
| 2008/0278223 A1 * | 11/2008 | Kernahan et al. | 327/538 |
| 2009/0177442 A1 | 7/2009 | Martin et al. | |
| 2010/0164476 A1 * | 7/2010 | Molchanov et al. | 324/76.82 |

\* cited by examiner

*Primary Examiner* — Kim Huynh
*Assistant Examiner* — Vincent Chang
(74) *Attorney, Agent, or Firm* — Maynard Cooper & Gale, P.C.; Jon Holland

(57) ABSTRACT

A system for adjusting core voltage of an integrated circuit to optimize power savings has a ring oscillator on the integrated circuit for providing a ring oscillator signal. The system also has compare logic on the integrated circuit configured to compare the ring oscillator signal with a clock signal from a clock external to the integrated circuit. The compare logic is configured to make a determination whether a frequency of the clock signal is within a predefined margin of a frequency of the ring oscillator and to adjust the core voltage of the integrated circuit based on the determination. Through such adjustments, the core voltage is lowered while ensuring that the core voltage does not reach a point that causes timing errors.

22 Claims, 6 Drawing Sheets

SYSTEMS AND METHODS FOR ADJUSTING CORE VOLTAGE TO OPTIMIZE POWER SAVINGS

BACKGROUND

The increasing speed, complexity, and density of digital circuits increase the power they consume. When a digital circuit is turned on, it constantly consumes power even when it is in a quiescent state. Further, the temperature of the environment can affect the amount of power that the digital circuit consumes. In this regard, efficiency typically varies inversely with temperature causing a digital circuit to generally consume more power as temperature increases.

In addition, the decreasing feature size of digital circuits causes high static leakage currents. A subtle core voltage swing at a low voltage, for example from 1 Volt to 1.05 Volts, can create a dramatic increase in quiescent current, and it is generally desirable to keep the core voltage as low as possible.

Indeed, circuit designers typically select the lowest core voltage that is consistent with the speed requirements of the digital circuit being designed. In this regard, the speed of digital logic varies with voltage and temperature, and in selecting the core voltage, a margin of error is used to ensure that adequate speed is maintained across a wide range of temperature conditions resulting in a core voltage that is higher than what is actually required for many conditions. Accordingly, during operation, the chip often consumes more power and generates more heat than what is actually required.

DESCRIPTION OF DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the figures.

DESCRIPTION

The present disclosure generally pertains to systems and methods for adjusting core voltages of integrated circuits in an effort to optimize power savings. In one exemplary embodiment, an integrated circuit (IC) receives a clock signal from an external clock that is used to control the timing of components within the IC, and the IC has a ring oscillator. The ring oscillator is designed so that its path is at least as long as the longest data path within the IC. Further, the path of the ring oscillator extends around a substantial portion of the IC, such as through each quadrant of the IC, so that the signal of the ring oscillator is affected by any process variations or manufacturing defects in the IC.

Compare logic within the IC compares the signal of the ring oscillator to the clock signal provided by the external clock. In this regard, since the ring oscillator path is at least as long as the longest data path in the IC, timing errors can be prevented by ensuring that the time for a transition of the ring oscillator signal to propagate the entire length of the ring oscillator path (referred to hereafter as "oscillator delay") is less than a period of the external clock signal. Thus, the compare logic is configured to control the core voltage of the IC to ensure that the oscillator delay remains equal to or less than the period of the clock signal.

In one exemplary embodiment, the compare logic dynamically lowers the core voltage thereby decreasing the speed of the IC until the oscillator delay is at or slightly less than the clock signal period within a predefined margin of error. As operating conditions change thereby affecting the speed of the IC, the compare logic dynamically adjusts the core voltage such that the oscillator delay remains at or slightly less than the clock signal period within the predefined margin. Since the core voltage can be dynamically adjusted based on comparisons of the ring oscillator signal and the clock signal to account for changing operating conditions, a smaller margin of error can be used to set the core voltage. Thus, the core voltage can be set to a lower voltage than would otherwise be possible or at least desirable in the absence of the monitoring and core voltage adjustments performed by the compare logic.

Figure 1:
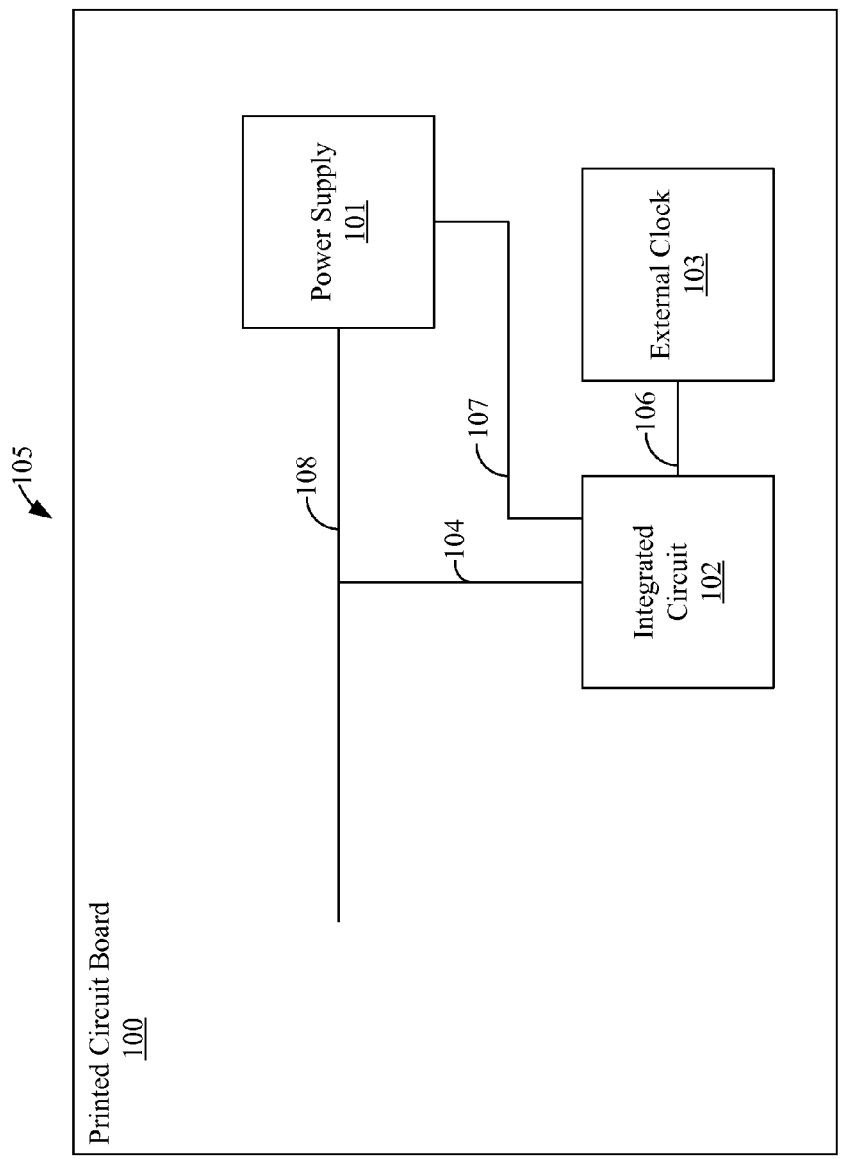
FIG. 1 is a block diagram of an exemplary system for adjusting core voltage to optimize power savings.

FIG. 1 is a block diagram depicting an exemplary embodiment of a system 105 for adjusting core voltage to optimize power savings in an integrated circuit (IC). The IC may be an application-specific integrated circuit (ASIC), a field programmable gate array (FPGA), or any type of electronic circuit having semiconductor devices that are manufactured in the surface of a substrate of semiconductor material.

The system 105 comprises a printed circuit board (PCB) 100. Mounted to the PCB 100 is a power supply 101, an IC 102, and an external clock 103. Connected to the power supply 101 is a power bus 108 that supplies a core voltage to the semiconductor devices that are mounted on the PCB 100, including the IC 102. The IC 102 is connected to the power bus 108 via an electrical connection 104. Via the power bus 108 and the connection 104, the power supply 101 supplies a core voltage to the IC 102. As shown by FIG. 1, the IC 102 is also coupled to the power supply 101 via a data connection 107 that allows the IC 102 to control the power supply 101, as will be described in more detail hereafter.

The external clock 103 is connected to the IC 102 via an electrical connection 106. The external clock 103 transmits a clock signal across the connection 106 to the IC 102. The clock signal oscillates between a high and a low state to coordinate actions of the circuits (not specifically shown in FIG. 1) in the IC 102. Further, in one embodiment, the clock signal is a square wave having a fifty-percent duty cycle that is at a fixed, constant frequency. In one embodiment, the circuits in the IC 102 change state at the rising edge of the clock signal, but other configurations are possible in other embodiments.

Figure 2:
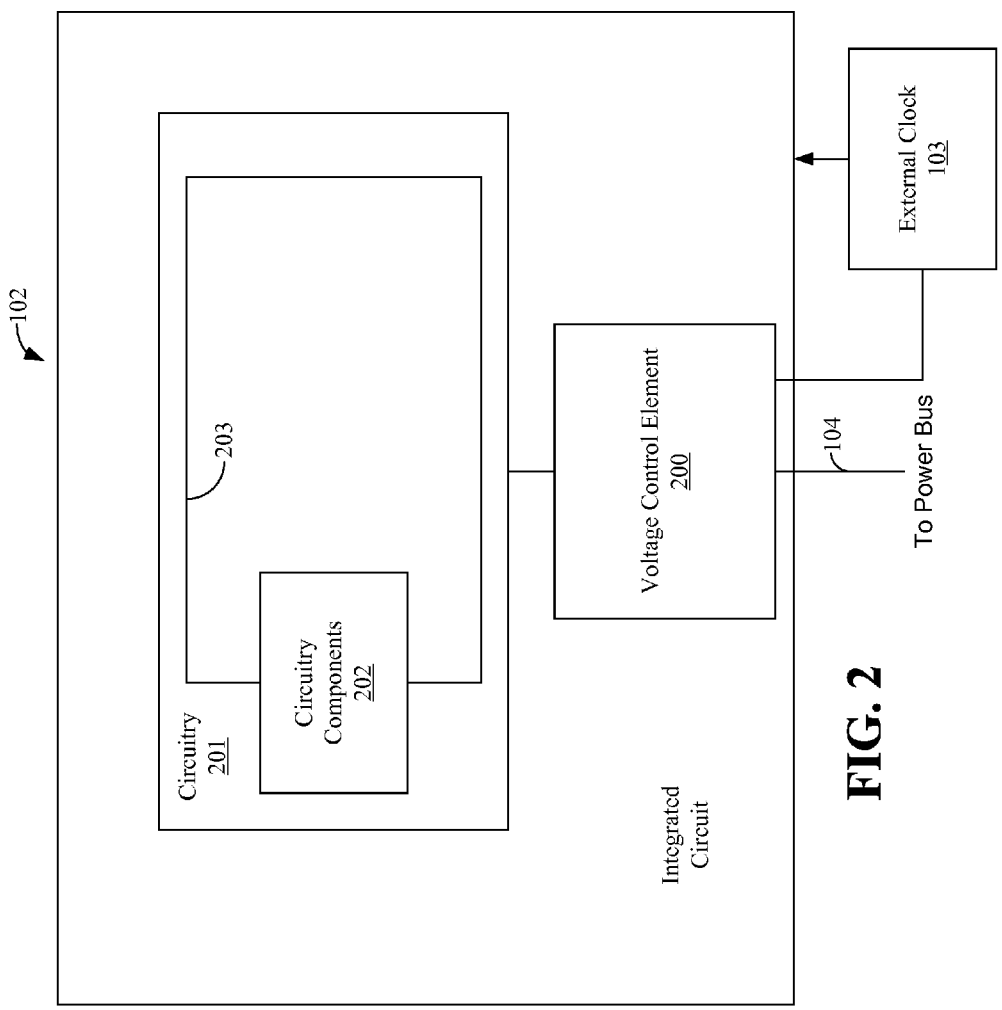
FIG. 2 is a block diagram of an exemplary integrated circuit, such as is depicted in FIG. 1.

FIG. 2 depicts an IC 102, such as is depicted in FIG. 1. The IC 102 comprises circuitry 201 that performs operations of the IC 102 depending on the IC's application. The circuitry 201 may comprise a plurality of transistor components (not shown) such as logic gates, flip-flops, and multiplexers, for example.

For purposes of illustration, FIG. 2 depicts an electrical data path 203, which comprises circuitry components 202. For illustrative purposes, assume that the data path 203 is the longest path in the IC 102 such that during operation it will have the longest path delay of any data path in the IC 102 with the exception of a ring oscillator, as will be described in more detail hereafter.

The IC 102 further comprises a voltage control element 200. The voltage control element 200 is connected to the power bus 108 (FIG. 1) via the electrical connection 104. Further, the voltage control element 200 is connected to the external clock 103, which was described hereinabove with reference to FIG. 1. In this regard, the external clock 103 generates a clock signal that is electrically transmitted to the voltage control element 200 and the circuitry 201 and which generally controls the timing of the circuitry 201.

During circuit design, the longest data path 203 within the IC 102 is identified, and a delay value indicative of the delay for the path 203 is determined. This delay refers to the amount of time for a signal transition to propagate across the entire length of the data path 203, including through the circuitry components 202. Further, the voltage control element 200 is manufactured with a ring oscillator 301 (FIG. 3) for generating a digital signal that oscillates at a frequency depending on the length of the ring oscillator path and various runtime conditions, such as temperature and core voltage.

Figure 3:
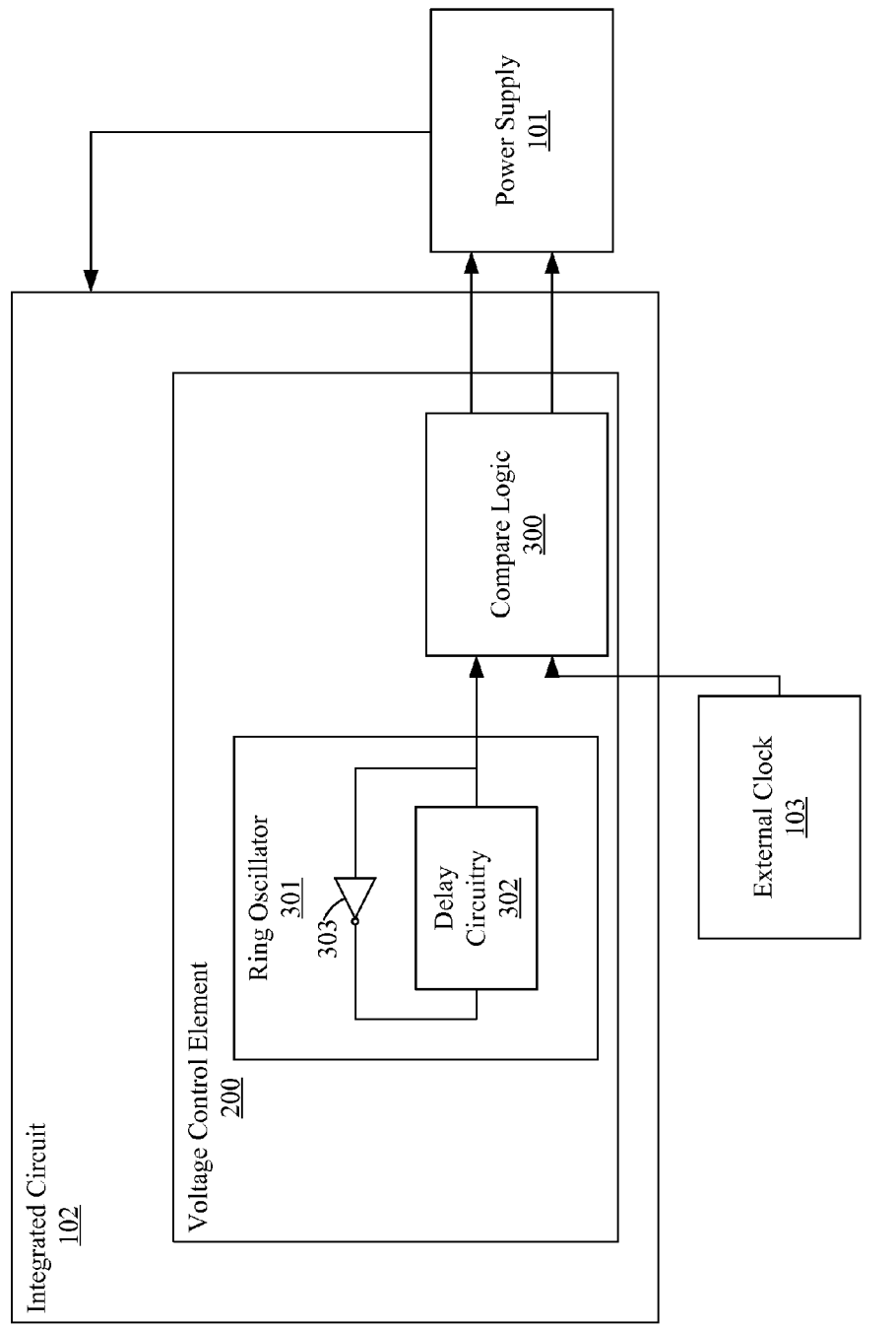
FIG. 3 is a block diagram of an exemplary voltage control element of an integrated circuit, such as is depicted in FIG. 2.
Figure 4:
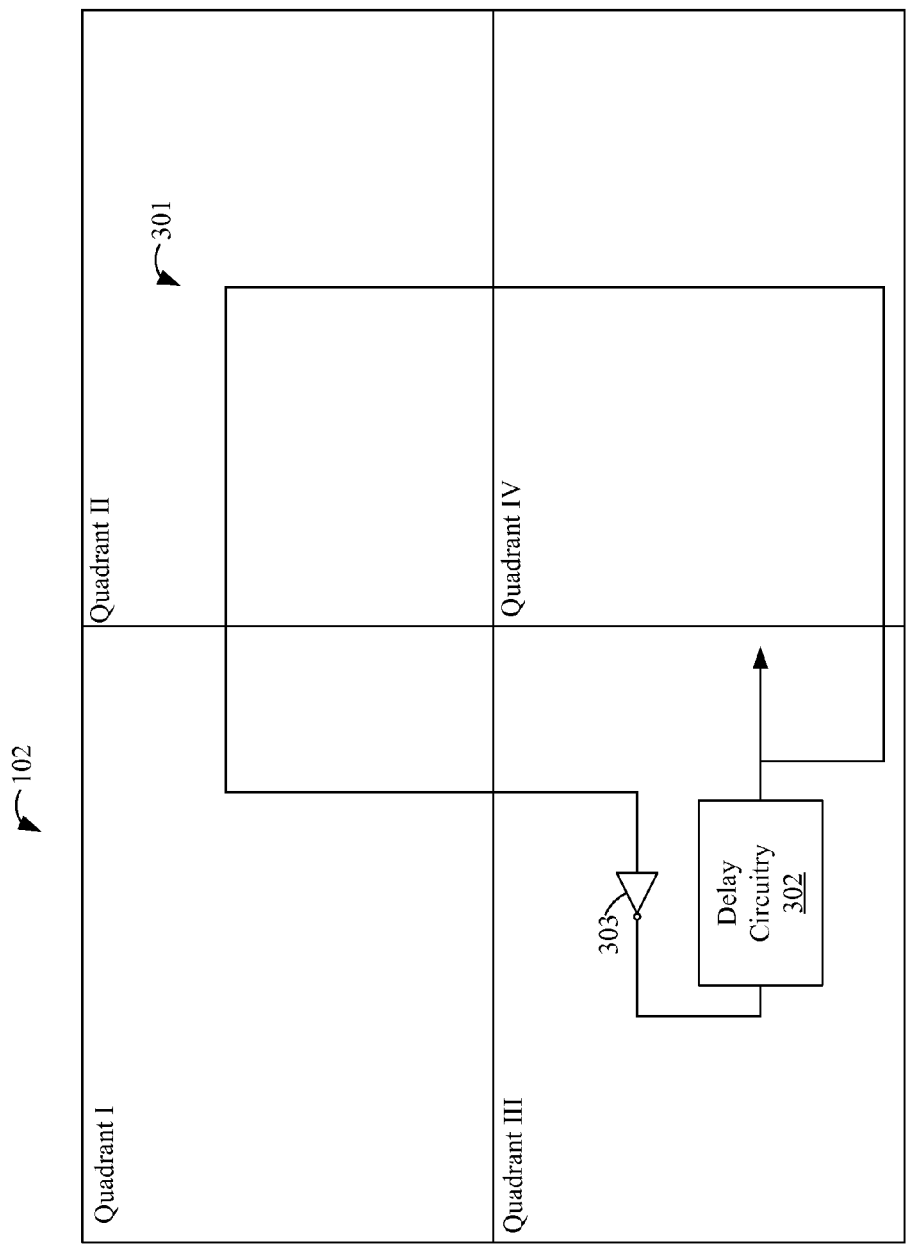
FIG. 4 is a block diagram of an integrated circuit, such as is depicted in FIG. 3, showing four quadrants.

FIG. 3 depicts an exemplary embodiment of the voltage control element 200. The voltage control element 200 comprises compare logic 300 that receives a clock signal from the external clock 103. In addition, the voltage control element 200 comprises a ring oscillator 301. The output of the ring oscillator 301 oscillates between two voltage levels, a high voltage level and a low voltage level (or a logical "1" and a logical "0"). In one exemplary embodiment, the ring oscillator 301 comprises an odd number of inverters that are attached in series, and the output of the last inverter is fed back into the first. Other configurations of the ring oscillator 301 are possible in other embodiments.

The ring oscillator 301 has delay circuitry 302, such as an even number of inverters connected in series, that delays the ring oscillator signal for a period substantially similar to the delay of the longest path 203 (FIG. 2). In this regard, it takes about the same amount of time for a transition of the ring oscillator signal to pass through the delay circuitry 302 as the time required for a transition of a data signal to propagate the entire length of the longest data path 203 (FIG. 2). As will be described in more detail hereafter, the compare logic 300 is configured to control the core voltage provided by the power supply 101 so that the delay of the ring oscillator 301 is less than the period of the clock signal within a predefined margin of error, referred to as the "timing margin."

In one embodiment, the timing margin is provided by an inverter 303. The output of the inverter 303 is the inverse of the input of the inverter 303, and the inverter's presence in the ring oscillator 301 creates a timing margin of one gate delay when the delay of the circuitry 302 equals the delay of the longest data path 203. By ensuring that the period of the clock signal is at least as long as the delay of the ring oscillator 301, it can be ensured that the period of the clock signal is longer than the delays of all other data paths, which as described above are shorter than the path of the ring oscillator 301. To increase the timing margin, additional logic gates or other circuitry could be added to the path of the ring oscillator 301. The more inverters or other components that are added, the delay of the ring oscillator 301 is increased thereby increasing the timing margin.

During operation, the core voltage provided by the power supply 101 is applied to the ring oscillator 301 at a threshold high enough to activate the delay circuitry 302 and the inverter 303. The ring oscillator 301 provides a digital output signal having a given frequency evidencing the delay of the ring oscillator path through the inverter 303 and circuitry 302. In this regard, the frequency decreases as the delay increases, and the frequency increases as the delay decreases. Notably, the delay and, hence, the frequency of the ring oscillator 301 is a function of core voltage among other factors such as temperature.

The voltage control element 200 compares the output signal provided by the ring oscillator 301 with the external clock signal produced by the external clock 103. If the comparison indicates that the frequency of the signal produced by the ring oscillator 301 is greater than the frequency of the external clock signal by at least a predefined margin, the voltage control element 200 transmits a signal to the power supply 101 to decrease the core voltage that is being supplied to the IC 102.

The predefined margin is selected such that, if the frequency of the ring oscillator 301 is greater than the frequency of the clock signal generated by the external clock 203, then the core voltage can be reduced, thereby slowing the components of the IC 102, without causing timing errors. By decreasing the core voltage supplied to the IC 102, the power consumed by the IC 102 is reduced.

If the comparison indicates that the frequency of the external clock signal produced by the external clock 103 is greater than the frequency of the ring oscillator 301, the voltage control element 200 transmits a signal to the power supply 101 to increase the core voltage that is being supplied to the IC 102 thereby increasing the speed of the IC 102 and, hence, the frequency of the IC components, including the ring oscillator 301.

In this regard, if the frequency of the ring oscillator 301 falls below the frequency of the clock signal, then the delay of the ring oscillator 301 has risen above the period of the clock signal. In such state, timing errors are imminent, and the core voltage is increased in order to prevent the delays of other data paths from approaching and exceeding the period of the clock signal.

Note that there are various techniques and algorithms that can be used to adjust the core voltage in response to a determination that it should be increased or decreased, as described above. In one exemplary embodiment, the core voltage is adjusted in equal steps. In this regard, for each voltage increase, the core voltage is changed by the same voltage amount, and for each voltage decrease, the core voltage is changed by the same voltage amount. In another example, the size of adjustments or steps can be changed depending on the frequency difference between the ring oscillator signal and the external clock signal.

In addition, in one exemplary embodiment, limits are placed on the possible range of the core voltage. That is, the core voltage is maintained above a lower voltage threshold and/or below an upper voltage threshold, though ensuring that core voltage remains within such a range is unnecessary.

To better illustrate the foregoing, an exemplary embodiment will now be described below in which the core voltage is maintained within a range from 0.95 Volts (V) and 1.05 V with steps equal to 0.01V. Initially, the voltage control element 200 controls the power supply 101 such that the core voltage is set to the highest voltage point of the range in order to ensure that there are no timing errors before the optimum core voltage for the current conditions is found. That is, the core voltage is set to 1.05 V.

As described above, the compare logic 300 compares the ring oscillator signal from the ring oscillator 301 to the clock signal from the external clock 103 over a number of cycles, referred to hereafter as a "sample period." For illustrative purposes, assume that the frequency of the ring oscillator signal is sufficiently greater than the frequency of the external clock signal such that the voltage control element 200 decides to decrease the core voltage. The voltage control element 200 then transmits a signal to the power supply 101 instructing the power supply to decrease the core voltage. In response, the power supply 101 steps the core voltage down by 0.01 V to 1.04 V. The voltage control element 200 then compares the ring oscillator signal and the external clock signal for the next sample period, and the core voltage is stepped down by 0.01 V for each sample period until the frequency of the ring oscillator signal is no longer sufficiently greater than the frequency of the external clock signal to warrant a further decrease in the core voltage or until the lower voltage threshold of 0.95 V is reached. Accordingly, the core voltage is set to either the lower voltage threshold of 0.95 V or to the lowest core voltage between 0.95 V and 1.05 V that ensures a proper clock signal frequency within the timing margin.

The voltage control element 200 continues to monitor the ring oscillator signal and the external clock signal and make adjustments as appropriate. As an example, assume that conditions change such that the frequency of the ring oscillator signal decreases relative to the frequency of the external clock signal causing the voltage control element 200 to decide to increase the core voltage. In such case, the voltage control element 200 transmits a signal to the power supply 101 instructing the power supply to increase the core voltage. In response, the power supply 101 steps the core voltage up by 0.01 V. The voltage control element 200 then compares the ring oscillator signal and the external clock signal for the next sample period, and the core voltage is stepped up by 0.01 V for each sample period until the frequency of the ring oscillator signal is no longer sufficiently below the frequency of the external clock signal to warrant a further increase in the core voltage or until the upper voltage threshold of 1.05 V is reached. Moreover, the core voltage is continually stepped up or down within the predefined allowable range of 0.95V to 1.05 V as appropriate in order to keep the core voltage as low as possible within range for the given timing margin to prevent timing errors.

Note that in FIG. 3 the voltage control element 200 is shown having a single ring oscillator 301 and one external clock 103. However, in other embodiments, the IC 102 may be spatially divided up into clock domains (not shown) that are serviced by more than one external clock. Thus, in other embodiments there may be more than one external clock. Each such clock may be compared to an output signal of a respective ring oscillator, as described above.

It should be noted that process variations and manufacturing defects can have a variable effect across an IC 102 such that the speed of the IC 102 in one region may differ slightly than the speed of the IC 102 in another region. In order to ensure that the path of the ring oscillator 301, which is designed to be the longest path, actually has the greatest delay relative to the other data paths of the IC 102 despite process variations and manufacturing defects, the ring oscillator 301 is designed such that its path extends around a substantial portion of the IC 102 such that any process variation or manufacturing defect in the IC 102 should affect the speed and, hence, frequency of the ring oscillator 301. For example, in one exemplary embodiment, the ring oscillator 301 is designed such that its path passes through each of four equally-sized rectangular quadrants: Quadrant I, Quadrant II, Quadrant III, and Quadrant IV. Further, the ring oscillator path passes sufficiently close to the center of each quadrant and/or the edges of each quadrant such that any process variation or manufacturing defect within such quadrant will affect the speed of the ring oscillator signal as it passes through the quadrant.

Figure 5:
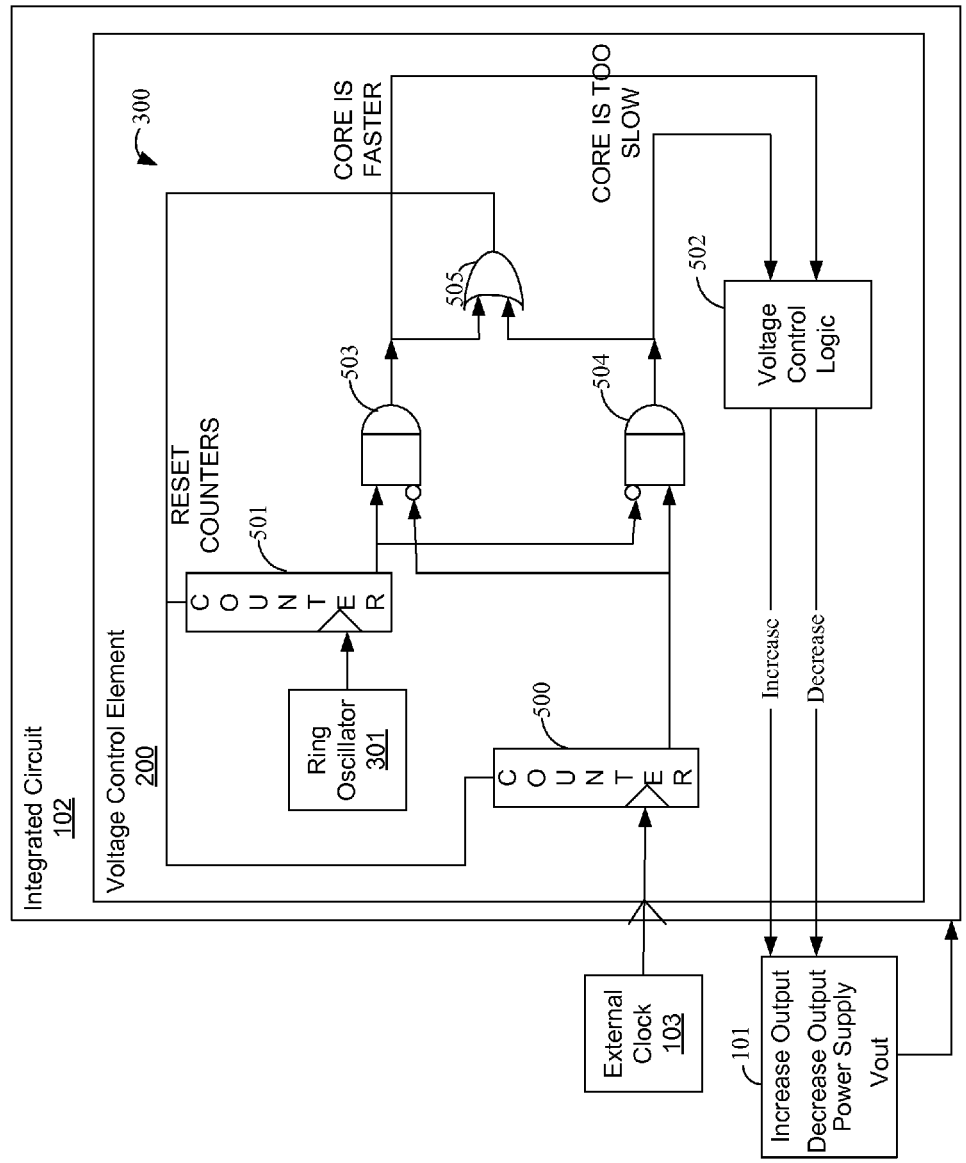
FIG. 5 is a block diagram of an exemplary circuit for use in a voltage control element, such as is depicted in FIG. 3.

FIG. 5 depicts an exemplary embodiment of the voltage control element 200. As shown by FIG. 5, the voltage control element 200 comprises counters 500 and 501, voltage control logic 502, AND gates 503 and 504, and an OR gate 505. The counters 500 and 501 are coupled to each of the AND gates 503 and 504, and the outputs of the AND gates 503 and 504 are coupled to the OR gate 505 and to the voltage control logic 502, which is coupled to the power supply 101.

The counter 501 counts each cycle of the ring oscillator signal. Thus, at any given time, the counter 501 stores the number of times that the ring oscillator 301 has cycled over a given time period thereby indicating the frequency of the ring oscillator 301 during such time period. The output of the counter 501 is deasserted (e.g., a logical "0") until a specified count threshold is reached. Once the counter 501 reaches the specified count threshold, the counter 501 asserts its output signal (e.g., transmits a logical "1"). Note that the output of the counter 501 is inverted before being received by the AND gate 504.

The counter 500 counts each cycle of the clock signal from the external clock 103. Thus, at any given time, the counter 500 stores the number of times that the external clock 103 has cycled over a given time period thereby indicating the frequency of the external clock 103 during such time period. The output of the counter 501 is deasserted (e.g., a logical "0") until a specified count threshold is reached. Once the counter 500 reaches the specified count threshold, the counter 500 asserts its output signal (e.g., transmits a logical "1"). Note that the output of the counter 500 is inverted before being received by the AND gate 503. In one exemplary embodiment, the specified count threshold used for the counter 500 is the same as the specified count threshold used for the counter 501.

If the counter 501 reaches the specified count threshold before the counter 500, the output of the AND gate 503 is asserted (e.g., transitions to a logical "1"). Assertion of the output of the AND gate 503 is passed through the OR gate 505 causing both counters 500 and 501 to reset. Upon reset, the output of each counter 500 and 501 is deasserted. Further, assertion of the output of the AND gate 503 indicates that the ring oscillator 301 is running faster than the external clock 103. The voltage control logic 502 counts consecutive assertions of the AND gate 503. In the context of this document, consecutive assertions of the AND gate 503 refers to a plurality of assertions of the AND gate 503 without any intervening assertions of the AND gate 504. When the count of consecutive assertions of the AND gate 503 reaches a predefined threshold, the voltage control logic 502 transmits a control signal for causing the power supply 101 to decrease the core voltage provided to the IC 102.

If the counter 500 reaches the specified count threshold before the counter 501, the output of the AND gate 504 is asserted (e.g., transitions to a logical "1"). Assertion of the output of the AND gate 504 is passed through the OR gate 505 causing both counters 500 and 501 to reset. Upon reset, the output of each counter 500 and 501 is deasserted. Further, assertion of the output of the AND gate 504 indicates that the external clock 103 is running faster than the ring oscillator 301. The voltage control logic 502 counts consecutive assertions of the AND gate 504. In the context of this document, consecutive assertions of the AND gate 504 refers to a plurality of assertions of the AND gate 504 without any intervening assertions of the AND gate 503. When the count of consecutive assertions of the AND gate 504 reaches a predefined threshold, the voltage control logic 502 transmits a control signal for causing the power supply 101 to increase the core voltage provided to the IC 102.

Note that, as described hereinabove, the voltage control logic 502 transmits a signal to the power supply 101 to increase or decrease the core voltage supplied to the IC 102. However, in one exemplary embodiment, there are upper and lower voltage thresholds that limit the core voltage regardless of the comparisons performed by the compare logic 300. Thus, if the comparisons indicate that the core voltage should be increased once the upper voltage threshold is reached, the system refrains from increasing the core voltage. For example, once the upper voltage threshold is reached, the power supply 101 may be configured to ignore voltage increase signals until the core voltage is decreased below the upper voltage threshold. Once the lower voltage threshold is reached, the power supply 101 may be configured to ignore voltage decrease signals until the core voltage is increased above the lower voltage threshold.

In an embodiment described above, the voltage control logic 502 is configured to count consecutive assertions of the output of the AND gates 503 and 504. Other configurations of the voltage control logic 502 are possible in other embodiments. For example, the voltage control logic 502 may simply count the assertions of the output of the AND gate 503 and count the assertions of the output of the AND gate 504. The voltage control logic 502 may then from-time-to-time determine the difference in the counts and adjust the core voltage if the difference is greater than a specified threshold. For example, if the count for the AND gate 503 is greater than the count for the AND gate 504 by the specified threshold, then the voltage control logic 502 decreases the core voltage. In one exemplary embodiment, the amount of the voltage decrease is proportional to the count difference, although it is possible to adjust the core voltage by the same amount for each adjustment. If the count for the AND gate 504 is greater than the count for the AND gate 503 by the specified threshold, the voltage control logic 502 increases the core voltage. In one exemplary embodiment, the amount of the voltage increase is proportional to the count difference, although it is possible to adjust the core voltage by the same amount for each adjustment.

Figure 6:
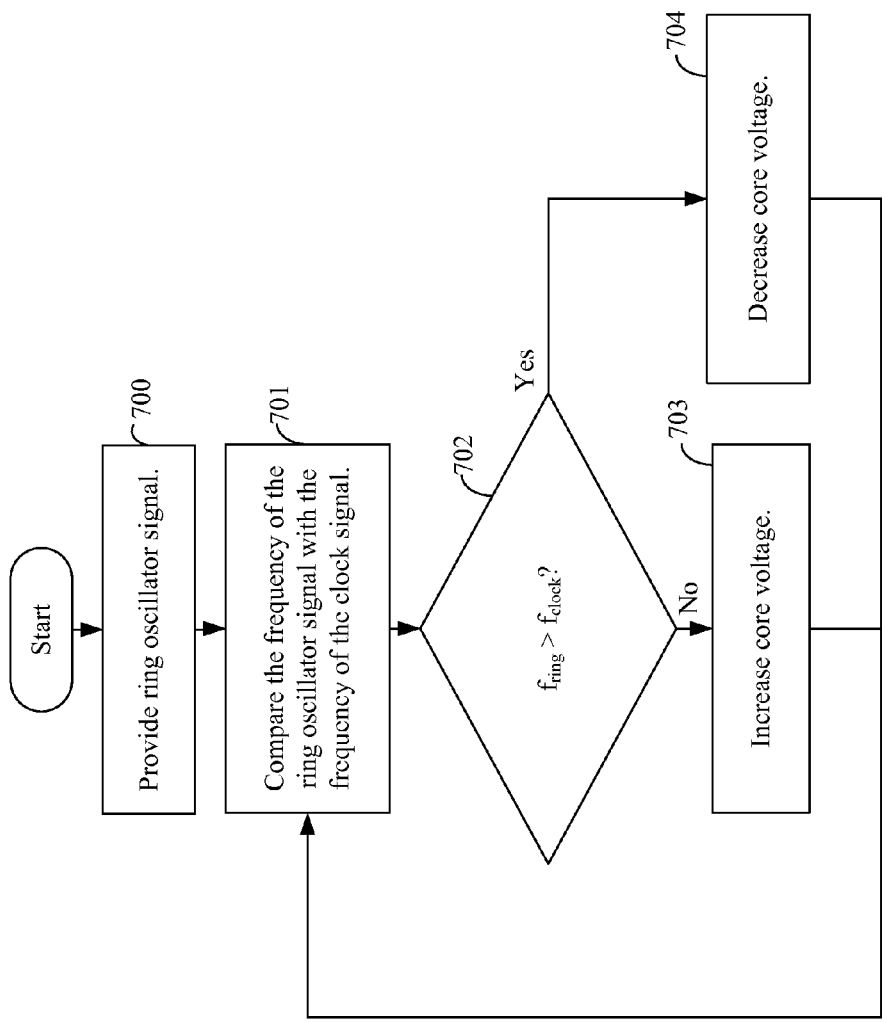
FIG. 6 is a flowchart depicting exemplary architecture and functionality of a voltage control element, such as is depicted in FIG. 3.

FIG. 6 is a flowchart depicting exemplary architecture and functionality of the voltage control element 200. In as shown by block 700, the ring oscillator 301 (FIG. 3) formed on an IC 102 (FIG. 3) generates a ring oscillator signal. As described above, the path of the ring oscillator 301 is preferably at least as long as the longest data path within the IC 102.

As shown by block 701, the compare logic 300 compares the frequency of the ring oscillator signal to the frequency of the external clock signal generated by the external clock 103 (FIG. 3). In particular, the compare logic 300 determines whether the frequency of the ring oscillator signal ($f_{ring}$) is greater than the frequency of the clock signal ($f_{clock}$), as shown by block 702.

If the ring oscillator signal has a frequency greater than the frequency of the external clock signal, the compare logic 300 transmits a signal to the power supply 101 (FIG. 3) to decrease the core voltage being supplied to the IC 102, as shown by block 704. However, if the external clock signal has a frequency that is greater than the frequency of the ring oscillator signal, the compare logic 300 transmits a signal to the power supply 101 to increase the core voltage being supplied to the IC 102, as shown by block 703.

Notably, the voltage control element 200 ensures that the IC 102 operates about an effective and efficient operating voltage point. If the core voltage being supplied to the IC 102 is so high that the circuitry 201 is running substantially faster than the external clock 103, the voltage control element 200 decreases the core voltage. If the core voltage being supplied to the IC 102 is so low that the circuitry 201 is not running substantially faster than the external clock 103 and timing errors are imminent, the voltage control element 200 increases the core voltage.

The invention claimed is:

1. A system for adjusting a core voltage of an integrated circuit, comprising:
   a ring oscillator on the integrated circuit for providing a ring oscillator signal;
   a clock external to the integrated circuit for providing a clock signal to control timing of circuitry on the integrated circuit; and
   compare logic on the integrated circuit configured to receive and compare the ring oscillator signal and the clock signal, the compare logic further configured to transmit a control signal for adjusting the core voltage based on a comparison of the ring oscillator signal and the clock signal, thereby adjusting a speed of the circuitry on the integrated circuit, such that a delay of a path of the ring oscillator is less than a period of the clock signal,
   wherein the delay of the path of the ring oscillator is at least as long as each other delay of a data path within the integrated circuit, and
   wherein by keeping the delay of the path of the ring oscillator less than the period of the clock signal, the compare logic is configured to ensure that timing errors associated with fluctuations in a speed of signal transitions within the integrated circuit are prevented.

2. The system of claim 1, wherein the integrated circuit has four equally-sized quadrants entirely covering a surface of the integrated circuit, and wherein the ring oscillator passes through each of the quadrants.

3. The system of claim 1, wherein the ring oscillator extends around a substantial portion of the integrated circuit such that manufacturing defects and process variations in any region of the integrated circuit affect the ring oscillator signal.

4. The system of claim 1, wherein the compare logic comprises a first counter for counting transitions of the ring oscillator signal and a second counter for counting transitions of the clock signal.

5. The system of claim 4, wherein the first counter is configured to assert an output signal based on whether a count of the first counter reaches a threshold.

6. The system of claim 5, wherein the compare logic is configured to reset the first and second counters based on a comparison of the count to the threshold.

7. The system of claim 1, wherein the compare logic is configured to perform a comparison between a frequency of the ring oscillator signal and a frequency of the clock signal and to determine whether to adjust the core voltage based on the comparison.

8. The system of claim 1, wherein the compare logic is configured to make a determination whether the frequency of the clock signal is greater than a frequency of the ring oscillator signal and to adjust the core voltage of the integrated circuit based on the determination.

9. The system of claim 1, wherein the compare logic is configured to increase the core voltage in response to a determination by the compare logic that a frequency of the clock signal is within a predefined margin of the frequency of the ring oscillator signal.

10. The system of claim 1, wherein the compare logic is configured to decrease the core voltage in response to a determination by the compare logic that a frequency of the clock signal is within a predefined margin of the frequency of the ring oscillator signal.

11. The system of claim 1, wherein the compare logic is configured to adjust the core voltage via the control signal to ensure the delay is less than the period of the clock signal by at least a predefined amount.

12. The system of claim 1, wherein the circuitry on the integrated circuit is configured to receive the clock signal and change states in response to edges of the clock signal.

13. A system for adjusting a core voltage of an integrated circuit, comprising:
 a ring oscillator on the integrated circuit for providing a ring oscillator signal; and
 compare logic on the integrated circuit configured to compare the ring oscillator signal with a clock signal from a clock external to the integrated circuit, the compare logic further configured to make a determination whether a frequency of the clock signal is within a predefined margin of a frequency of the ring oscillator and to adjust the core voltage of the integrated circuit based on the determination thereby adjusting a speed of circuitry on the integrated circuit such that a delay of a path of the ring oscillator is less than a period of the clock signal,
 wherein the delay of the path of the ring oscillator is at least as long as each other delay of a data path within the integrated circuit, and
 wherein by keeping the delay of the path of the ring oscillator less than the period of the clock signal, the compare logic is configured to ensure that timing errors associated with fluctuations in a speed of signal transitions within the integrated circuit are prevented.

14. A method for adjusting a core voltage of an integrated circuit, comprising:
 providing a ring oscillator signal via a ring oscillator on the integrated circuit;
 receiving a clock signal from a clock external to the integrated circuit;
 comparing the ring oscillator signal with the clock signal; and
 adjusting the core voltage based on the comparing, thereby adjusting a speed of circuitry on the integrated circuit, such that a delay of a path of the ring oscillator is less than a period of the clock signal,
 wherein the delay of the path of the ring oscillator is at least as long as each other delay of a data path within the integrated circuit, and
 wherein by keeping the delay of the path of the ring oscillator less than the period of the clock signal, timing errors associated with fluctuations in a speed of signal transitions within the integrated circuit are prevented.

15. The method of claim 14, wherein the ring oscillator extends around a substantial portion of the integrated circuit such that manufacturing defects and process variations in any region of the integrated circuit affect the ring oscillator signal.

16. The method of claim 14, further comprising:
 counting transitions of the ring oscillator signal via a first counter; and
 counting transitions of the clock signal via a second counter.

17. The method of claim 16, further comprising comparing a count of the first counter to a threshold.

18. The method of claim 17, further comprising resetting the first and second counters based on the comparing.

19. The method of claim 14, wherein the comparing comprises comparing a frequency of the ring oscillator signal with a frequency of the clock signal.

20. The method of claim 14, wherein the comparing comprises determining whether a frequency of the clock signal is less than the frequency of the ring oscillator signal.

21. The method of claim 14, wherein the adjusting comprises adjusting the core voltage based on the comparing to ensure the delay is less than the period of the clock signal by at least a predetermined amount.

22. The method of claim 14, further comprising receiving the clock signal by the circuitry on the integrated circuit, wherein the circuitry on the integrated circuit changes states in response to edges of the clock signal.

* * * * *